Aug. 10, 1948. B. MARCELLUS ET AL 2,446,544
METHOD OF AND APPARATUS FOR OPERATING UPON WARPS
Filed Dec. 6, 1945 7 Sheets-Sheet 1

INVENTORS
Brooks Marcellus and
Byrt A. Peterson
BY
ATTORNEYS

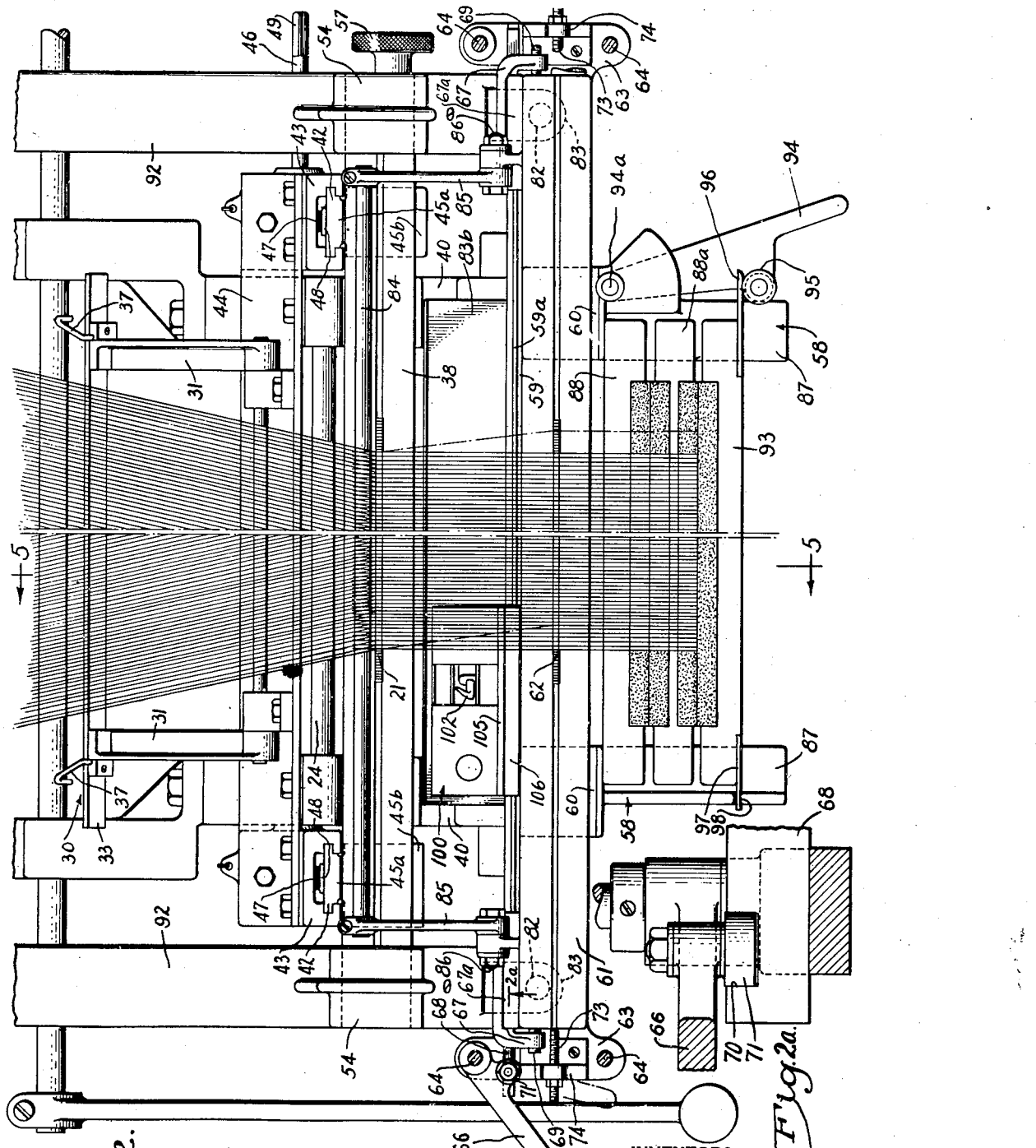

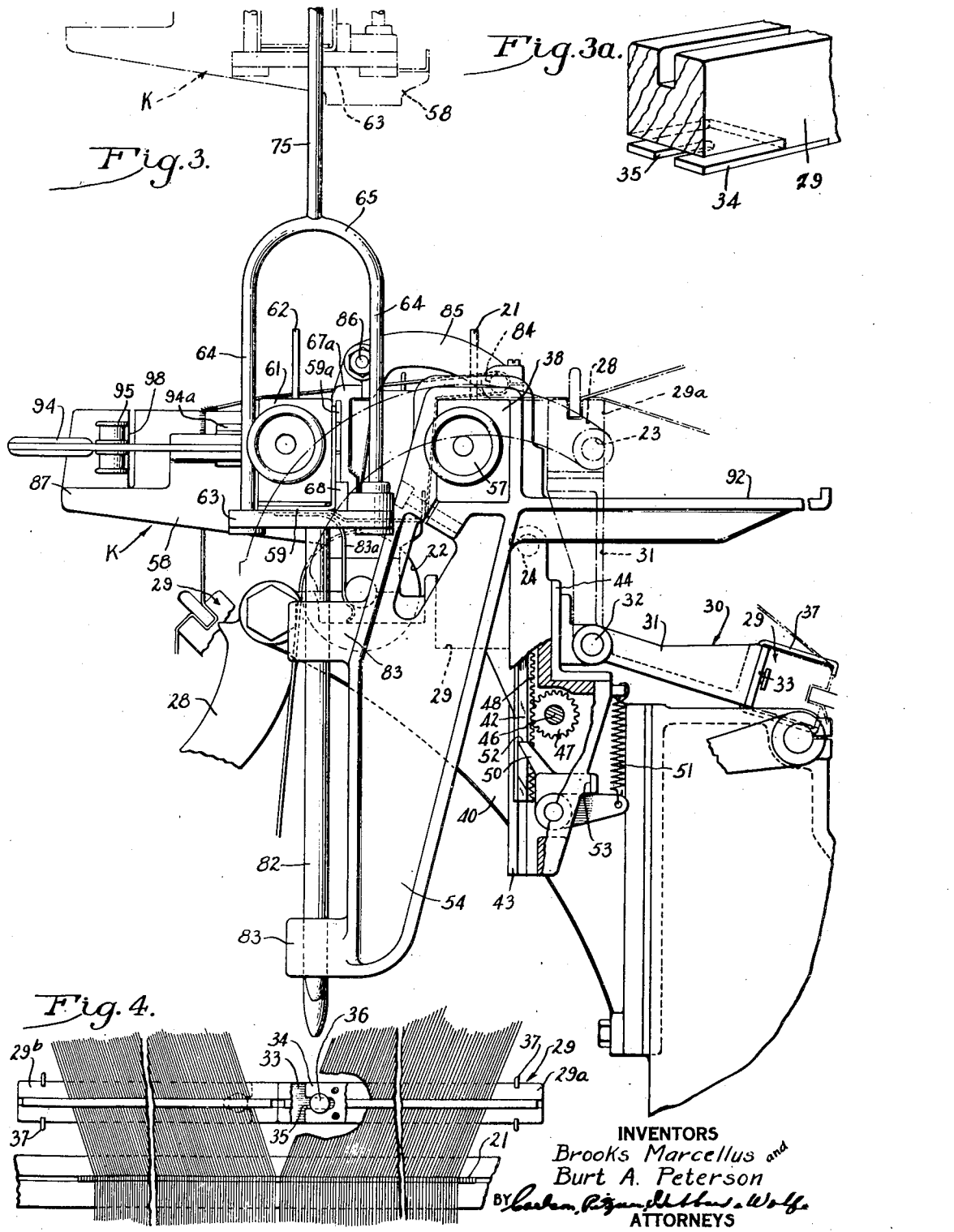

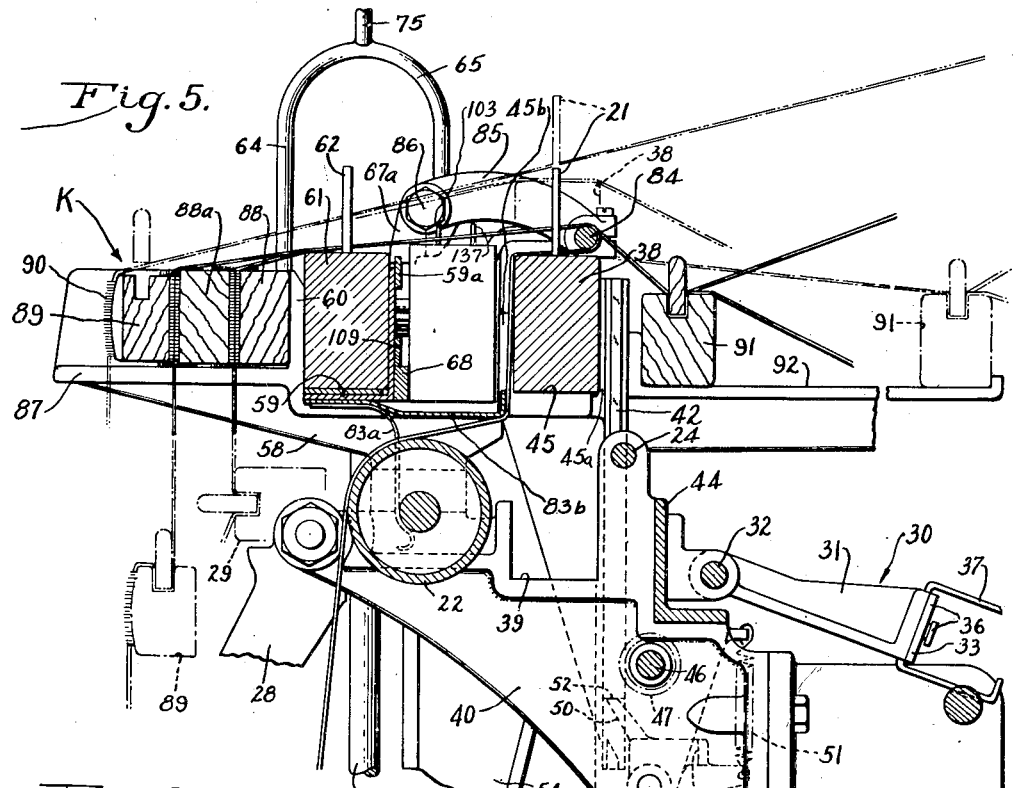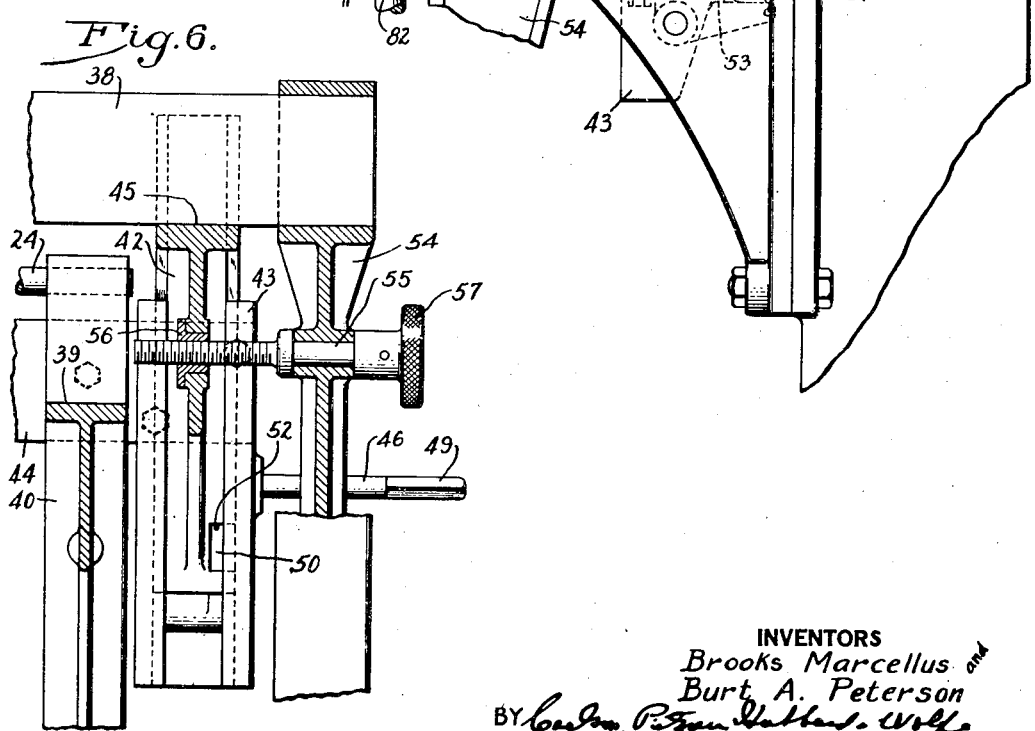

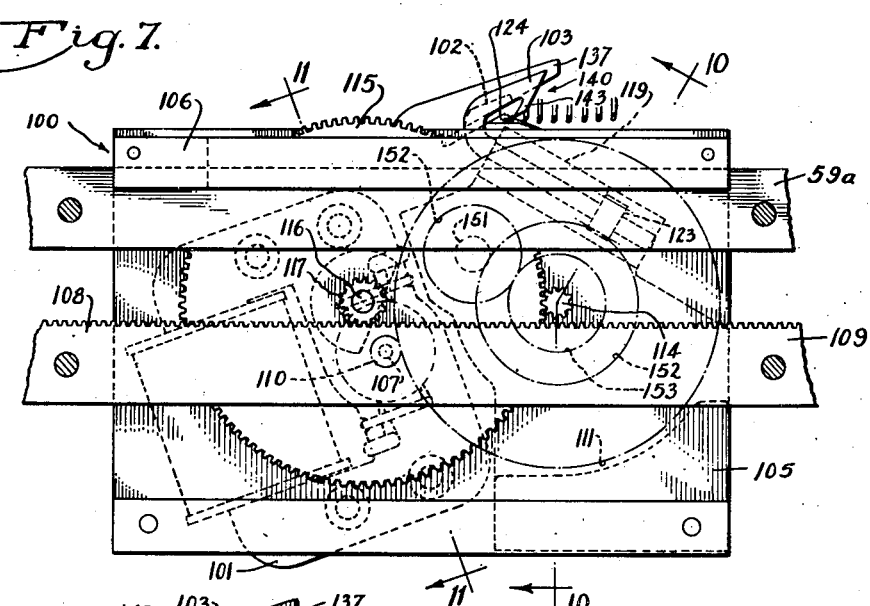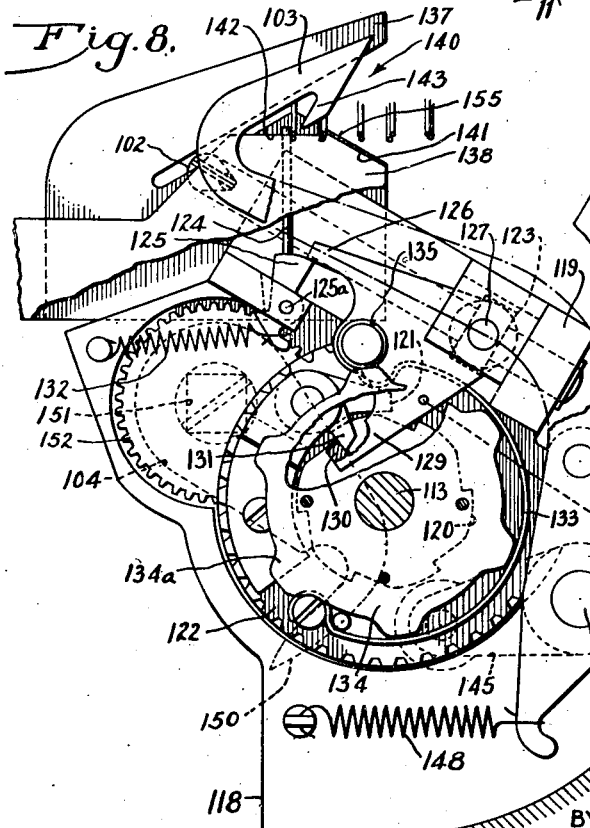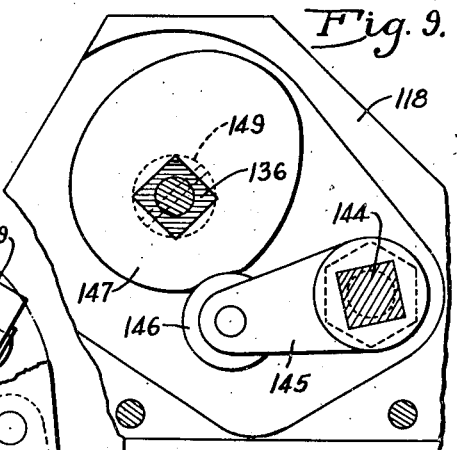

Aug. 10, 1948. B. MARCELLUS ET AL 2,446,544
METHOD OF AND APPARATUS FOR OPERATING UPON WARPS
Filed Dec. 6, 1945 7 Sheets-Sheet 6
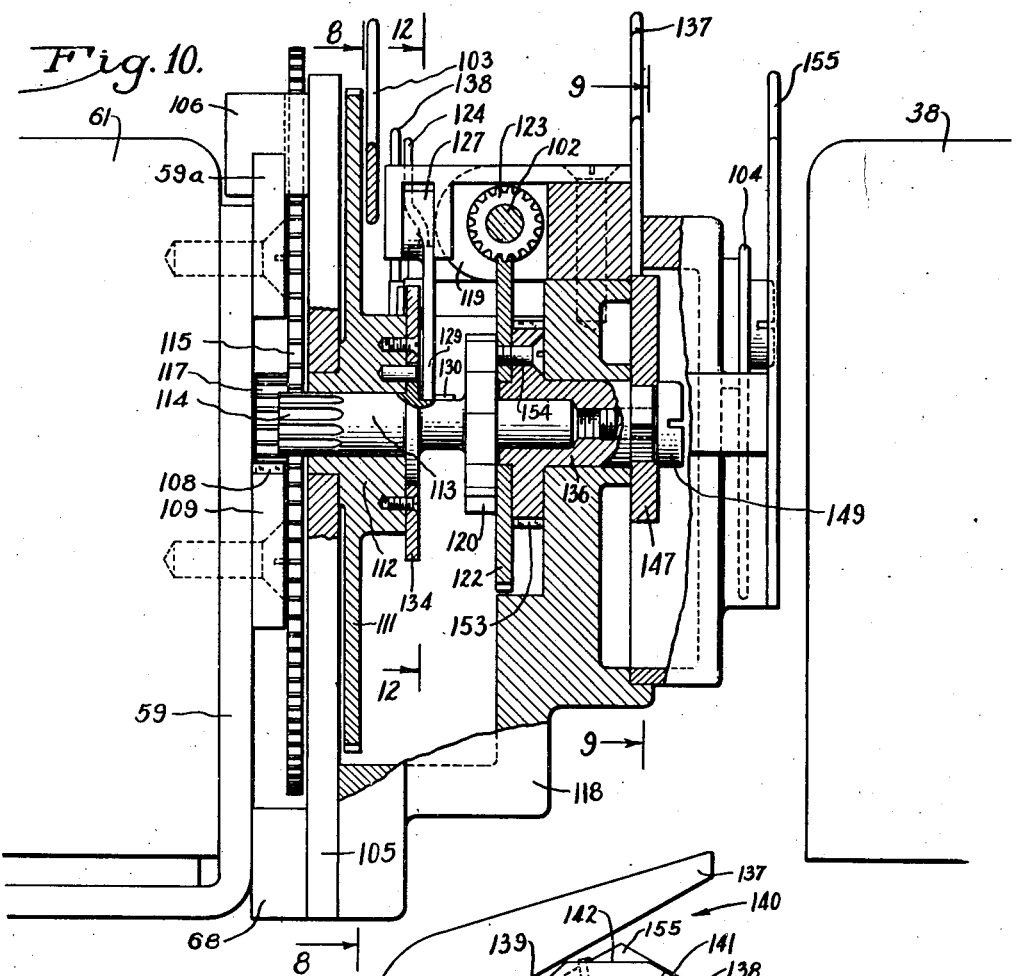
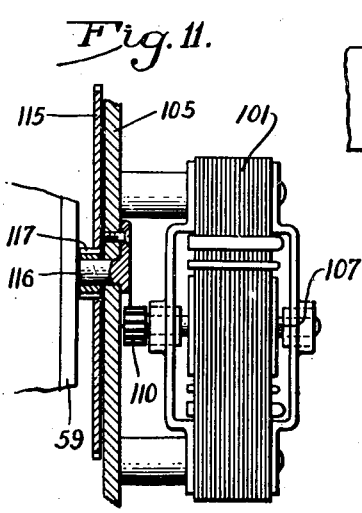
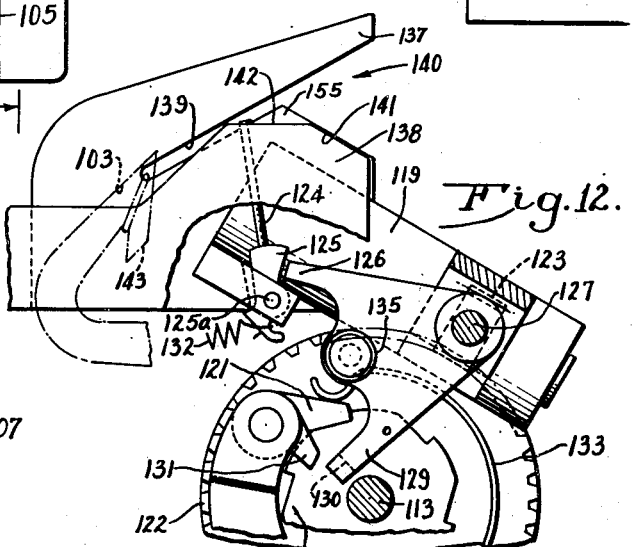
INVENTORS
Brooks Marcellus and
Burt A. Peterson
BY
ATTORNEYS Aug. 10, 1948.    B. MARCELLUS ET AL    2,446,544
METHOD OF AND APPARATUS FOR OPERATING UPON WARPS
Filed Dec. 6, 1945    7 Sheets-Sheet 7

INVENTORS
Brooks Marcellus and
Burt A. Peterson
BY
ATTORNEYS

Patented Aug. 10, 1948

2,446,544

UNITED STATES PATENT OFFICE 2,446,544

METHOD OF AND APPARATUS FOR OPERATING UPON WARPS

Brooks Marcellus and Burt A. Peterson, Rockford, Ill., assignors to Barber-Colman Company, Rockford, Ill., a corporation of Illinois Application December 6, 1945, Serial No. 633,192

39 Claims. (Cl. 28—49)

The invention relates to the tying of two warps under special conditions requiring a manipulation of the warps to position and maintain the thread ends in proper spaced parallel relationship and under proper tension for the tying operation.

One object of the invention is to facilitate the manipulation of the warps to be united so as to pair and position the threads of one warp with those of the other.

A further object is to provide for the preparation of the two warps in a novel and advantageous manner through the use of combs and clamps serving to hold pairs of threads to be tied in uniformly spaced relation and under proper tension so as to dispense with the thread selecting means usually embodied in the knotter mechanism.

Another object is to provide a knotter mechanism of a practical character for operating upon the spaced pairs of threads and adapted to tie and sever the same rapidly and certainly.

Another object is to provide a knotter mechanism which automatically adjusts itself to the tying of paired warp threads which may be variously spaced in different warps depending upon the adjustment of expansible combs.

While the invention is susceptible of various applications, it is herein shown applied to a winder of the warper type, the source of the new warp being a creel supporting a plurality of yarn masses such as cheeses. In the operation of the warper, individual threads running from the cheeses are wound simultaneously upon a warp beam. In some instances it is desirable that the warp beam be composed of predetermined lengths of yarn for use in the loom in weaving various patterns. For example, in the weaving of colored handkerchief cloth, the length of the warp of one color is comparatively short, and when such short lengths are wound upon separate beams as is the present practice, considerable waste of time and labor is involved, particularly in threading the separate warps through the slasher wherein the warps are sized preliminary to the weaving operation.

With the foregoing in view, the present invention aims to dispense with the necessity for winding short lengths of yarn on separate beams and in lieu thereof to produce full beams of yarn at the warper, each beam composed of desired lengths of different yarns, e. g. of different colors, tied together so as to eliminate the labor of threading separate warps of small length through the reed, comb and lease rods at the delivery end of the slasher.

A further object is to provide in a warper or the like means for manipulating the old and new warps so as to arrange threads taken from the respective warps in spaced parallel relation, together with an associated knotter mechanism for operating upon the paired threads to tie them together and cut off the ends.

The objects and aims of the invention thus generally set forth are attained by the construction and arrangement shown by way of illustration in the accompanying drawings forming a part hereof, wherein:

Fig. 2 is a fragmentary plan view of the warper showing the knotter mechanism in association therewith.

Fig. 2a is a fragmentary sectional view taken approximately in the plane of line 2a—2a of Fig. 2, on an enlarged scale.

Fig. 3 is a fragmentary side elevational view of the warper with the knotter mechanism in place and illustrating in broken lines the mechanism in vertically detached relation to the warper.

Fig. 3a is a perspective view of one end of one of the warp clamps.

Fig. 4 is a fragmentary plan view illustrating the clamps for the old warp.

Fig. 5 is a fragmentary vertical sectional view taken approximately in the plane of line 5—5 of Fig. 2.

Fig. 6 is a fragmentary vertical sectional view illustrating the adjustment of the combs.

Fig. 7 is a fragmentary side elevational view of the tying mechanism.

Fig. 8 is a fragmentary vertical sectional view taken approximately in the plane of line 8—8 of Fig. 10 and showing the tying mechanism in relation to the paired strands to be united.

Fig. 9 is a fragmentary vertical sectional view taken approximately in the plane of line 9—9 of Fig. 10 and showing the cam means for operating a thread hook.

Fig. 10 is a transverse sectional view through the tying mechanism taken approximately in the plane of line 10—10 of Fig. 7.

Fig. 11 is a fragmentary vertical sectional view taken approximately in the plane of line 11—11 of Fig. 7 and showing the drive motor.

Fig. 12 is a fragmentary vertical sectional view taken approximately in the plane of line 12—12 of Fig. 10.

Figure 1:
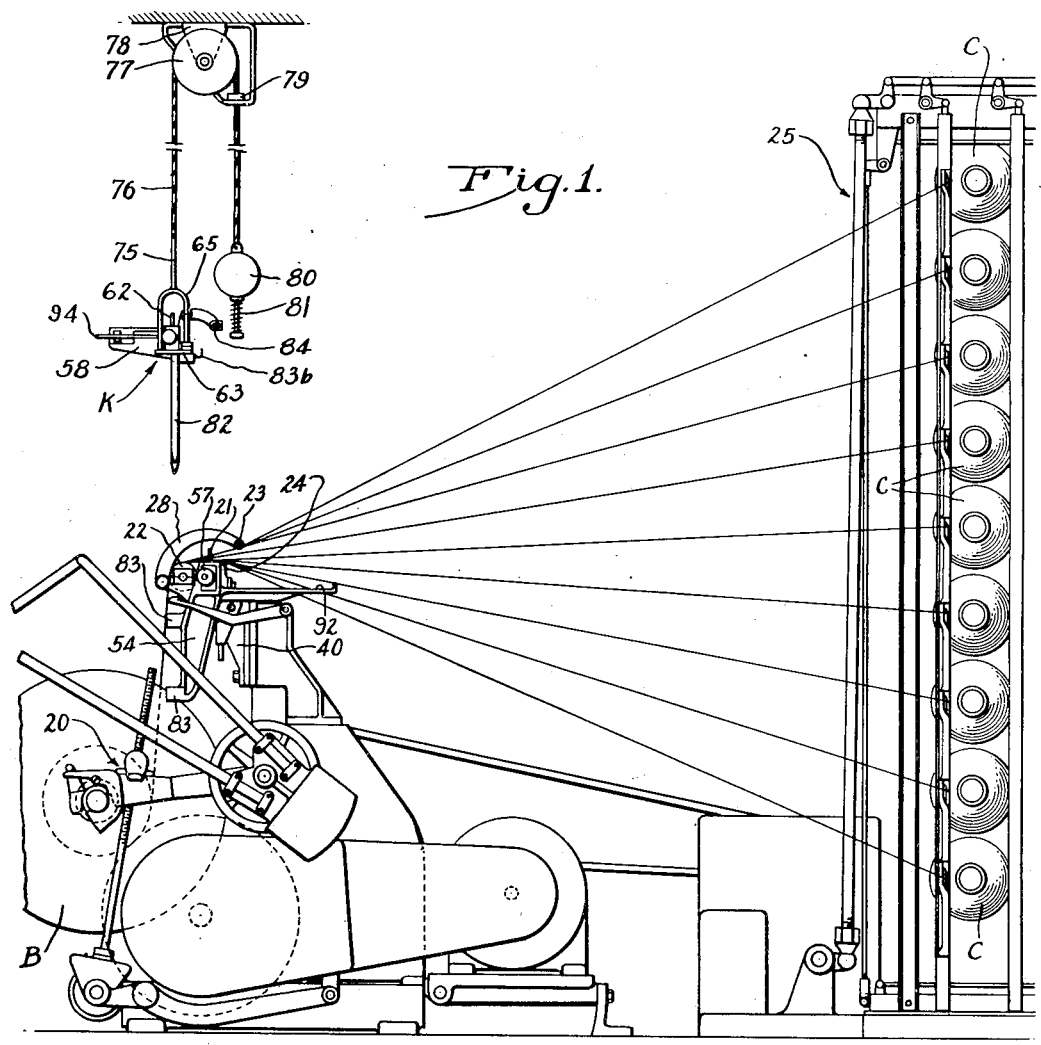
Figure 1 is a fragmentary side elevational view of a warper and creel, showing in detached relation a knotter mechanism for movement into association with the warper for the purpose of tying new warp threads leading from the creel to old warp threads on the beam of the warper.

The invention is shown embodied in a warping apparatus comprising briefly a warper upon which is removably supported a warp beam B and upon which the warp is wound, and a creel supporting individual cross wound yarn masses or cheeses C supplying individual yarn strands composing the warp. The warper comprises, in brief, means 20 removably supporting the warp beam upon the warper frame, and guide means for a multiplicity of yarn strands including a comb 21, providing dents for receiving and guiding individual strands, and a roller 22 disposed forwardly of the comb and over which the yarn strands pass downwardly to the beam. Guide rods 23 and 24 are disposed rearwardly of the comb 21 and serve to confine the strands to retain them in the comb, the upper guide rod 23 being supported for swinging movement into an out-of-the-way position to permit of access to the comb.

The creel may be of the general character disclosed in Colman Patent No. 1,207,138. It comprises, in brief, an upright frame or rack 25 providing individual supports for a multiplicity of cheeses C appropriately spaced. As shown in said patent, the creel may be made in two relatively diverging sections, one only being shown herein.

THE INVENTION IN GENERAL

The invention provides for the replenishment as may be desired of the warp supply by interrupting the rotation of the warp beam, severing the strands leading from the supply to the beam, providing a new warp supply, clamping and manipulating the old and new warp strands to form two sheets of yarn having their strands arranged in pairs with the strands of each pair taken from the respective sheets and the paired strands spaced apart uniformly, and then tying the paired strands by means of a knotter mechanism. The knotter mechanism is especially constructed for operation upon paired or preselected strands with the pairs of strands spaced apart a uniform distance, the mechanism being driven at a predetermined uniform rate across the combined warps and operating upon successive pairs to position them with respect to a rotary tying bill. In order to be able to operate upon warps of different sley without adjustment of the feed rate, the knotter mechanism is preferably so constructed that successive tying cycles are initiated automatically at a frequency determined by the spacing of the strands.

WARP PREPARATION

Apparatus

In the present illustrative embodiment of the invention, the warp wound upon beam B constitutes in effect the old warp. When from time to time it is desired to provide a new warp supply as, for example, when it is desired to tie in a new warp of a different color, the operation of the apparatus is interrupted, the old warp severed between the warper and the creel, the cheeses on the creel replaced and the loose ends drawn from the new cheeses and placed in the warper in a manner such as to form a new warp to be tied to the old. For tying the two warps a knotter unit K is provided, this unit being movably suspended above the warper in a manner such as to permit easy lowering into operative association therewith (Figs. 3 and 5).

As shown in Fig. 1, the old warp attached to the beam B normally extends upwardly over the roller 22 and thence rearwardly through the dents 27 of the comb 21. The upper guide rod 23 normally occupies the position shown in Fig. 1, being supported upon arms 28 so as to be swingable forwardly and downwardly into an out-of-the-way position.

In changing or replenishing the warp, the strands of the old warp are clamped in two alined tongue clamps generally designated 29 and specifically identified by the numerals 29a and 29b (Fig. 4). These clamps are supported close to the comb 21 so that the strands may be more readily clamped in spaced relation as determined by the spacing of the comb dents 27. Two tongue clamps are employed by preference to facilitate manipulation of a relatively wide warp. Particularly is this true when the creel is made in two upright sections as shown in said Colman patent.

Provision is made for supporting the tongue clamps 29 for movement in a direction away from the warper comb rearwardly therefrom so as to produce a slack length of yarn for tying purposes, the warp beam B being revolved reversely during such movement of the clamps 29. As here shown, the supporting means for the clamps is in the form of a swinging frame 30 comprising a pair of arms 31 pivoted on the warper frame 32 and connected by a cross bar 33. The clamps are attached to plates 34 (Figs. 3a and 4) removably secured to the frame. For this purpose, the adjacent ends of the clamps are cut away to expose the corresponding ends of the plates 34 which are notched as at 35 to receive headed studs 36 mounted on the cross bar 33 of the frame 30. At their opposite or outer ends the clamps may be attached to the frame bar by means of releasable wire catches 37.

It will be understood that, in the normal operation of the warper, the frame 30 occupies a rearwardly and downwardly inclined position as shown in full lines in Fig. 3. In the replenishing operation, the frame together with its tongue clamps 29 is swung into vertical position as shown in broken lines in said figure and the old warp fastened in the clamps. Thereupon the strands are cut between the clamps and the creel, preferably at a point adjacent the clamps, and the frame is then swung rearwardly to draw off the slack length required in the manipulation of the warp ends preparatory to the tying operation.

The comb 21 hereinafter referred to as the warper comb may be of the type shown in Colman Patent No. 1,503,637. It is mounted upon an elongated block 38 normally positioned (see Fig. 1) immediately rearward of the roll 22. In this position it is received in recesses 39 (Fig. 5) formed in two side brackets 40 which also support the roll 22 and the arms 28 carrying the thread guide rod 23. When preparing the warps for tying, the comb is raised so as to be disposed above and somewhat rearwardly of the roll 22, in a convenient position for the association therewith of the knotter unit K (Fig. 3).

For raising and lowering the comb 21 and its supporting block 38, the latter is supported at opposite ends in slides 42 (Figs. 2, 5 and 6) guided in vertical guide members 43, the latter being carried by an angle bar 44 rigid with the brackets 40. Rigid with the upper ends of the slides 42 are frames providing rectangular openings 45 slidably receiving the comb block 38 so as to support the same for endwise adjustment of the comb as will presently be described. The openings 45 are formed by two legs 45a and 45b (Figs. 2 and 5) cast integral with the slides 42.

The comb may be adjusted vertically by the rotation of a shaft 46 (Fig. 3) carrying pinions 47 at opposite ends (one only being shown) meshing with racks 48 rigid with slides. The shaft 46 is suitably journaled in the warper frame and has a square projecting end 49 for the reception of a suitable crank. At each end, the comb is sustained in its elevated position by means of a latch 50 urged by a spring 51 into engagement with a shoulder 52 on the slide, movement of the latch by the spring being limited by a stop lug 53.

At opposite ends the comb block 38 projects beyond the slides 42 and to these projecting ends are clamped two side members 54 (Fig. 6) depending from the block at opposite sides of the warper frame (Figs. 2 and 3). It is desirable that the warper comb be adjustable transversely of the warp so as to insure that in the normal operation of the machine the comb will guide the strands of the warp properly with repect to the warp beam B. For this purpose, one of the side members 54 (the right as seen in Fig. 2) carries an adjusting screw 55 (Fig. 6) held against axial movement relative to the member and engaging in a nut 56 fixed in the adjacent slide 42. By turning a handle 57 on the screw, the comb block together with its end member 54 may be shifted relative to the guides 42 as permitted by the sliding engagement between the comb block and the upper frame portions of the guides.

The side members 54 additionally provide support for the knotter unit K when lowered into operative association with the warper. The unit comprises as shown a supporting frame composed of two castings 58 rigidly secured near the opposite ends of a frame or angle bar 59. The castings have upstanding arms 60 (Fig. 5) spaced forwardly from the vertical leg of the angle bar so as to form therewith a recess for receiving the supporting block 61 of a second comb 62. Between this comb and the warper comb 21 is disposed the tying mechanism mounted on the frame bar 59 for traveling movement transversely of the warper as will presently be described. Rigid with the opposite ends of the frame bar 59 at opposite ends of the comb block 60 are two cross arms 63. To each of these arms is attached the legs 64 of a U-shaped member 65 by means of which the tying unit is suspended for movement into and out of association with the warper.

The knotter comb 62 is identical with the warper comb 21 and its block 61 is adjustably mounted on the angle bar 59 for endwise movement through manipulation of a hand lever 66 (Figs. 2 and 2a). For this purpose, the comb block is securely clamped between two angular end members 67 fixed on the opposite ends of a slide bar 68 bearing on the castings 58 so as to be movable transversely of the warper. Each of the members 67 is provided with a clamp screw 69. At one end, the bar 68 has a groove 70 in its upper edge (Fig. 2a) for the reception of a roller 71 carried by a hand lever 66 pivoted on one of the legs of the adjacent U-shaped member 65. The angular clamping members 67 have upstanding portions 67a grooved to receive slidably the upper edge portions of a transverse guide bar 59a (Fig. 3) fixed to the rear side of the knotter frame bar 59. Movement of the slide bar 68 with its comb clamping bars 67 is limited by adjustable stop screws 73 mounted in brackets 74 secured to the cross arms 63.

The knotter unit may be suspended in elevated or disassociated relation to the warper in any suitable or preferred manner. As herein shown, the U-shaped members 65 are equipped with anchoring rods 75 to which are attached cables 76 passing over sheaves 77. The latter are shown as supported in a bracket 78 attached to the ceiling of the room or other convenient support, and the cables pass downwardly over the sheaves through guides 79 and finally through counterweights 80, the ends of the cables being equipped with cushion springs 81. To retain the knotter unit in proper relation to the warper its supporting frame is provided with depending rods 82 adapted to be received in spaced guides 83 rigid with the side members 54 of the warper. Spring detents 83a rigid with the knotter frame yieldably engage with the trunnions of the thread roll 22 to hold the knotter in position upon the warper against the action of the counterweights. When the knotter unit is lowered into position upon the warper the strands of the old warp running from the comb 21 to the beam are engaged by a guide plate 83b, also secured to the knotter frame, and pressed downwardly as shown in Fig. 5.

After the strands of the old warp have been fastened in the tongue clamps 29 and severed from the cheeses C on the creel, the operator transfers the tongue clamps from their position on the swinging frame 31 rearwardly of the warper into a position forwardly of the warper as permitted by the slack length of yarn drawn from the beam in the rearward swinging movement of the frame 31. In this operation, the strands of the old warp are doubled back upon themselves (Fig. 3) by engagement with a rod 84 positioned immediately rearwardly of the warper comb 21 and the individual strands placed in the dents of both of the combs 21 and 62. The rod 84 is on the knotter unit K. As herein shown, it is mounted upon arms 85 pivoted at 86 to the upstanding portions 67a of the angular comb clamping members 67.

As seen in Fig. 5, the knotter unit frame is adapted to carry additional clamps forwardly of the comb 62, the castings 58 being extended forwardly to provide transversely spaced arms 87. The first of these clamps is a plush clamp consisting of two similar members 88 and 88a, one of which is a single faced clamp placed upon the arms by the operator preliminary to the reverse folding of the old warp, and the other of which is a double faced clamp placed upon the arms to grip the threads passing downwardly to the tongue clamps 29.

The new warp drawn from a new set of cheeses in the creel is laid in the combs 21 and 62 with the individual strands paired with the strands of the old warp and the ends terminating forwardly of the knotter unit. To facilitate manipulation of the new warp three additional clamps are employed. Of these, a tongue clamp 89 (Fig. 5) is placed upon the arms 87 of the knotter frame. This clamp is faced with card cloth 90 having downwardly pointing wires adapted to engage the strands of yarn laid in the combs 21 and 62 and drawn downwardly over the clamp so as to hold the same against upward movement. Another tongue clamp 91 is adapted to be supported at the rear side of the warper upon arms 92, the purpose of this clamp being to hold the new warp firmly while it is being tied. Also, it facilitates withdrawal of the united strands from the combs after the knotting operation. Finally, a plush clamp 93 is adapted to be placed upon the arms 87 in lieu of the tongue clamp 89 after the latter has been removed from the arms and suspended below them as shown in broken lines in Fig. 5.

After the two warps have been positioned in the combs and while held under tension by the tongue clamps 29 and 89, the three plush clamps 88, 88a and 93 are clamped together through the manipulation of a hand lever 94 (Fig. 2). This lever is pivoted at 94a on one of the arms 87 and carries a roller 95 engageable with a plate 96 projecting from the adjacent end of the plush clamp 93. A similar plate 97 on the other end of this clamp engages in a notch 98 in the adjacent arms 87.

WARP PREPARATION

Operation

Assuming that it is desired to tie a new warp of a different color onto the old warp wound upon the beam, operation of the warping apparatus is interrupted and the thread rod 23 swung forwardly and downwardly from the position shown in Fig. 1. The warper comb 21 is then raised from its normal running position to the elevated position shown in Fig. 3. This may be termed the intermediate position for the comb. It is accomplished manually through the operation of the shaft 46 having rack and pinion connection with the slide 42 rigid with the comb.

The next step is to draw a slack length of yarn from the old warp. This is done by swinging the frame 31 carrying tongue clamp 29 upwardly into the broken line position shown in Fig. 3, clamping the two sections of the old warp in two alined clamps 29a and 29b, cutting the strands between the clamp and the creel and then swinging the frame downwardly and rearwardly while reversely rotating the warp beam. It will be seen that the clamps 29 are positioned closely adjacent the comb 21 during the clamping operation so that the spaced strands may be placed conveniently over the body of the clamps before the tongues are inserted.

The knotter unit is now lowered from the position shown in Fig. 1 to that shown in Fig. 3, the guide rods 82 having first been inserted in the apertured lugs 83 on the side members 54 of the warper. The warper comb 21 having been elevated to its intermediate position, the knotter comb 62 is disposed in forwardly spaced relation to the comb 21. Also, as a result of such positioning of the knotter unit, the auxiliary thread rod 84 is located rearwardly adjacent the knotter comb 21.

The old warp strands leading to the clamps 29 are now to be laid in the combs 21 and 62 and their end portions clamped between plush clamps 88 and 88a. In this operation, tongue clamp 29a is first released from its supporting frame 30 (the latter occupying the full line position in Fig. 5) and then carried forwardly by the operator so as to double the strands about the rod 84, care being exercised to lay the individual strands in the dents of the combs 21 and 62. Preceding such thread manipulating movement, the tongue clamp 88 will have been positioned on the arms 87 so that after the strands have been laid in the combs they may be passed over the plush clamp 88 and drawn taut by the weight of the suspended tongue clamp 29a. The operation is repeated with the other section of the warp through a similar manipulation of the tongue clamp 29b.

The old warp having been positioned in the warper and knotter combs, the next step is to place the new warp. In preparation for this operation, the warper comb is raised to its top position shown in broken lines in Fig. 5, the comb being sustained in this top position by the latches 50 engaging with the lower ends of the slides 42. Next, the plush clamp 88a (Fig. 13) is placed in position on the arms 87, clamping the strands of the old warp. Then tongue clamp 89 with its card cloth 90 is placed on the arms 87, and tongue clamp 91 placed on the arms 92 rearwardly of the warper comb.

The cheeses C in the creel are now replaced with new ones to provide the new warp supply and strands drawn from the individual cheeses are laid in the dents of the combs 21 and 62, and the end portions drawn over the card cloth 90 of clamp 89 and held by the latter temporarily until the tongue of clamp 89 can be inserted in position. When this has been done, the clamp 89 is removed from the arms 87 and allowed to hang with the strands passing over the forward face of the plush clamp 88a. Next, the tongue is inserted in tongue clamp 91 so as to clamp firmly the strands of the new warp supply.

The warper comb 21 is now lowered into its intermediate position (Fig. 5), being sustained in this position by latches 50 engaging shoulders 52 on the slides, and to take up the slack incident to this lowering of the comb the warp beam is revolved forwardly. With the strands held taut by the suspended clamp 89, plush clamp 93 (Fig. 13) is placed against the plush clamp 88a and held in position against it by the clamping lever 94. The old and new warps are now severed between their respective clamps 29 and 89 and the plush clamps supported on the arms 87.

Figure 14:
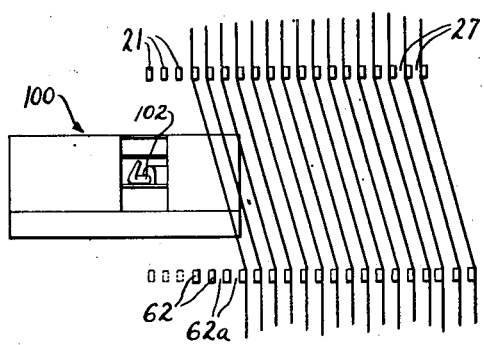
Fig. 14 is a schematic view illustrating the manner in which two combs are relatively adjusted in order to position the paired strands accurately preliminary to the tying operation.

Finally, the knotter comb 62 is shifted to the right (Figs. 2 and 14) so as to position the strands against opposite sides of the teeth of the two combs, with the strands bearing on the left-hand side of the dents 27 in the comb 21 and on the right-hand side of the dents 62a of the comb 62. This insures accurate spacing of the paired strands while permitting of the use of dents of a width substantially in excess of that necessary to accommodate the strands.

THE TYING MECHANISM

The two warps having thus been positioned with the strands of the respective warps arranged in pairs in the dents 27 and 62a of the warper and knotter combs, the operation of the tying mechanism is in order. Due to the pairing of the strands in uniform spaced relation, this mechanism may be of relatively simple construction and the tying operation performed rapidly and with a high degree of certainty. In general, the tying mechanism forms a part of the knotter unit and comprises a carriage 100 mounted on the knotter frame for traveling movement transversely of the warper and carrying an electric drive motor 101 for propelling the carriage at a uniform speed across the combined warps.

The tying mechanism is of the type employing a rotary tying bill, the latter being indicated generally at 102. The bill is actuated cyclically in the progress of the carriage, and means including a thread hook 103 driven in timed relation to the tying bill serves to seize the paired strands and present them to the tying bill successively. The tying bill includes the usual clamping and shearing means, the latter operating to sever the ends of the warps leading to the plush clamps 88, 88a and 89, and the knot is drawn taut and stripped from the bill by means of a stripper 104.

Referring now to Figs. 7 to 13, the mechanism includes a carriage which in the present instance is in the form of a generally rectangular plate 105 (Fig. 7) disposed vertically and guided for movement longitudinally, i. e., transversely of the warper, upon the knotter frame. As shown, the carriage plate has a guide member 106 secured thereto for interfitting and sliding engagement with the upper edge of the bar 59a on the knotter frame bar 59.

For propelling the carriage along the guide bar 59a, the motor shaft 107 has a reduction gearing connection with a stationary rack 108 on a bar 109 fixed to the knotter frame bar 59. In particular, the motor shaft carries a spur pinion 110 (Figs. 7, 10 and 11) meshing with a spur gear 111 whose hub 112 is rigid with a stub shaft 113. Formed on the latter is a pinion 114 meshing with a spur gear 115 rotatively supported upon a stud 116 (Fig. 11) mounted in the carriage plate 105. The gear 115 is disposed on the forward side of the carriage plate and has rigid therewith a pinion 117 meshing with a rack 108.

The motor, as shown in Fig. 11, is of the shaded pole induction type, adapted to operate at a substantially constant speed. The motor is rigidly secured to the plate 105 in spaced relation thereto so as to accommodate the pinion 110 and its meshing gear 111.

When the motor is energized, the knotter carriage moves at uniform speed from left to right (Fig. 7), and when the right-hand edge of the warp is reached, travel is interrupted by the pinion 117 running out of mesh with the rack 108, the latter being of such a length as to insure travel of the carriage through the full width of the warp. Restoration of the knotter carriage to the opposite side of the warp is accomplished by lifting the carriage sufficiently to clear the rack teeth 108, the pinion 117 being normally held in mesh with the rack merely by the weight of the carriage.

The knotter comprises a suitable supporting frame 118 upon which is mounted a barrel 119 for the tying bill 102. In the present instance successive tying cycles are initiated automatically in response to engagement with successive pairs of warp strands. The reason for such control by the yarn strands is to render the knotter capable of operating without adjustment upon warps of different sley, it being only necessary that the rate of travel of the knotter carriage be correlated with the pitch of the paired strands so as to allow ample time for the performance of the successive cycles. It will therefore be understood that where the pitch of the paired strands does not vary, the knotter may operate continuously.

The means for actuating the knotter under the control of the spaced strands comprises a ratchet disk 120 (Figs. 8 and 12) driven continuously, and a dog 121 pivotally mounted on a gear 122 which meshes with a spiral gear 123 on the knotter bill. Engagement of the dog 121 with the ratchet disk 120 to perform a tying cycle is controlled by a sensitive feeler 124 positioned for engagement with the paired strands of yarn in the travel of the knotter carriage.

The dog 121 is normally held out of engagement with the ratchet 120 by means of coacting latch members 125 and 126 (shown engaged in Fig. 8 and disengaged in Fig. 12). The former is in the form of a block pivoted at 125a and rigid with the feeler 124, and the latter is in the form of a finger pivoted at 127. The latch finger 126 is urged downwardly by a spring 128 and carries an arm 129 with a stop lug 130 normally engaged by a tail 131 on the dog 121 so as to be held out of driving engagement with the ratchet disk 120. A spring 132 acting on the latch block 125 and therefore on the feeler 124 tends to hold the latch members 125 and 126 in engagement, and when the feeler is swung by engagement with a pair of strands, the latch members are disengaged and the lug 130 withdrawn from the tail 131 of the dog. Thereupon, a leaf spring 133 acts upon the dog 121 to force it into engagement with the ratchet disk for rotation with the latter through one revolution. The dog is withdrawn from the ratchet disk at the end of such revolution by the engagement of the tail 131 with the stop lug 130, the latter having been shifted into active position by means now to be described.

Inasmuch as the disengagement of the latch members 125, 126 is dependent upon the tension of the strands engaged by the feeler 124, means is provided to minimize the force required to effect such disengagement by periodically relieving the frictional pressure between the two latch members. Such periodic relief occurs at uniformly spaced intervals in the travel of the knotter mechanism substantially corresponding to the spacing of the paired strands. It is accomplished in the present instance by means of a cam disk 134 having a plurality of uniformly spaced lobes 134a (Fig. 8) acting upon a roller follower 135 mounted on the latch member 126. The cam is pinned to the hub 112 of the gear 111 (Fig. 10) forming a part of the drive train for the knotter carriage, and is thus timed with the travel of the tying mechanism. The arrangement is such that as the feeler 124 moves into engagement with each pair of strands to be tied, the latch finger 126 is lifted free of the block 125 so that the only force to be overcome by the strands in causing disengagement of the latch members is the force of the relatively light spring 132. Disengagement of the latch members permits movement of the dog into engagement with the ratchet 120 as above described and immediately thereafter the roller follower 135 is engaged by the succeeding cam lobe 134a so as to restore the latch member 126 to its upper or active position. Thus, in addition to its function in relieving frictional engagement between the latch members the cam 134 acts to condition these members for the next tying cycle. Moreover, coincidental with the lifting of the latch member 126 the stop lug 130 is shifted into the path of movement of the tail 131 of the dog 121 to withdraw the latter from the ratchet disk upon the completion of one revolution.

It will be seen that while the shaft 113 and hence the ratchet 120 and cam 134 are rotated continuously in the travel of the knotter carriage, full rotational movements are imparted intermittently to the drive gear 122 for the tying bill 102. As shown in Fig. 10, gear 122 is rigid with respect to a tubular shaft 136 journaled in the knotter frame in axial alinement with the stub shaft 113 and providing a bearing for the latter.

Suitably mounted on the knotter carriage and spaced apart lengthwise of the warps are two stationary thread guides 137 and 138, respectively, disposed on the right and left-hand sides of the knotter bill as seen in Fig. 10. The guide 137 (see Fig. 12) is in the form of a plate having a slot 139 inclined downwardly and rearwardly with respect to the travel of the carriage and terminating at its forward end in a V opening or throat 140. The other guide 138 provides an upwardly and rearwardly inclined edge 141 terminating in a horizontal edge 142 over which the strands slide in the advance of the carriage. The guide 138 is disposed closely adjacent the feeler 124 and, as will be seen from Fig. 8, the horizontal guiding and supporting edge 142 is disposed approximately in the plane of the combined warps while the upper edge of the feeler 124 projects slightly above the guiding edge 142.

Although the strands of the two warps are, in effect, preselected by their separation in pairs in the dents of the combs 21 and 62, their spacing is too close to permit of operation of the tying bill on one pair of strands without interference from the next pair. Also, it is necessary to provide slack for the knotter bill. Accordingly, the cam operated hook 103 is employed. This hook seizes each successive pair of strands and draws them rearwardly into proper position with respect to the tying bill 102. As shown (Fig. 8), it is in the form of a lever arm positioned adjacent the guide 138, the free end of the arm being formed with a rearwardly and downwardly projecting finger 143. The arm is pivoted at 144 and has a second arm 145 rigid therewith and carrying a roller 146 (Fig. 9) engaging a disk cam 147, the follower being held against the cam by spring 148. The cam 147 is driven with the tying bill. Thus it is mounted on the outer end of the ratchet driven shaft 136 which is squared for this purpose, the cam being held in position on the shaft by a screw 149.

At the end of the tying operation, the knot is stripped from the tying bill by means of the stripper 104 (Figs. 8 and 10) in the form of an arm having a hooked end portion 150. The stripper arm is mounted upon the squared outer end of a shaft 151 journaled in the frame. Rigid with this shaft is a spur gear 152 (Fig. 7) meshing with a gear 153 attached by screws 154 (Fig. 10) to the tying bill drive gear 122. Thus the stripper is timed with respect to the tying cycle, making one complete revolution for each cycle. A thread guide 155 disposed adjacent the stripper 104 (Fig. 10) coacts with the guide 137 to provide spaced abutments on opposite sides of the stripper against which the yarn is pulled in the operation of the stripper.

Operation of tying mechanism

It may be assumed that the two warps have been prepared in the manner described above and the knotter carriage positioned at the left side of the warper as viewed in Fig. 2: A control switch (not shown) is closed to start the motor 101, and the carriage is advanced at a uniform rate, the drive being from the motor pinion 110, spur gear 111, shaft 113 and pinion 114, to the spur gear 115 and axial pinion 117 to the rack 108. In the advance of the carriage each pair of strands is directed by the guides 137, 138 into position on the horizontal edge of the guide 138 for convenient seizure by the hook 103 so as to be drawn thereby into separated relation to the next pair of strands while at the same time providing slack for the tying operation.

In response to the movement of the feeler 124 caused by engagement thereof with the first pair of strands, the latch block 125 is moved out from under the finger 126 allowing spring 128 to withdraw tail 131 of the dog from the stop lug 130. Thereupon, the leaf spring 133 swings the dog into engagement with the rotating ratchet disk 120 (Fig. 12) to start a tying cycle. Preliminary to such engagement of the latch members, the multilobed cam 134 engages roller 135 on the latch member 126 lifting the latch finger and relieving the pressure between it and the latch block exerted by the spring 128.

Upon engagement of the dog 121 with the ratchet disk 120, gear 122 is rotated through one complete revolution and cam 147 is actuated to cause thread hook 103 to swing downwardly against the action of the spring 148, holding the follower roller 146 against the cam. At the same time spur gear 122 drives the tying bill through its cycle so that the strands are tied and severed in the well known manner. At the end of the tying cycle, the stripper 104, rotated by spur gearing 152, 153, is swung into engagement with the strands held against the guides 137 and 155 to pull the knot taut and strip it from the tying bill.

Following the disengagement of the latch members 125, 126, the cam 134 engages roller 135 to lift the latch finger 126 so as to reengage the latch members for the next cycle. At the same time, the stop lug 130 is raised into blocking relation to the tail of the dog to disengage it from the ratchet disk 120 upon completion of the tying cycle.

STRAND MANIPULATION

Following tying operation

Figure 13:
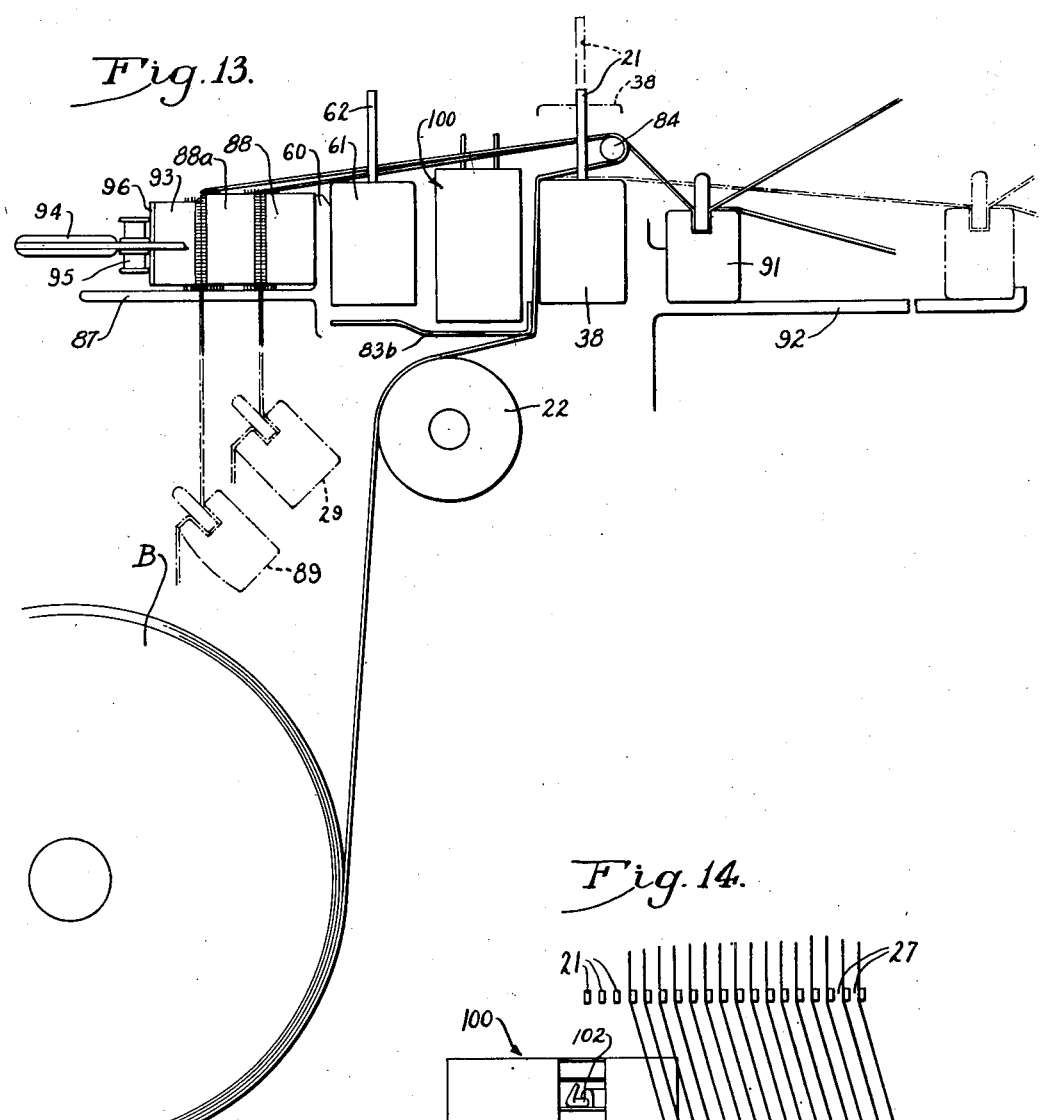
Fig. 13 is a schematic view showing the two warps after manipulation into position preparatory to the tying operation, certain clamps for the ends of the strands being shown in broken lines.

After the new warps have been tied, care must be exercised to avoid snarling or tangling of the tied strands, and it has been found that this can be accomplished effectually as follows, reference being made especially to Fig. 13: Plush clamps 88, 88a and 93 are first removed. Thereupon the tying mechanism is returned to the left-hand side of the warp (Fig. 2) and knotter comb 62 shifted to the left by operating the lever 66 to position the comb for the ensuing operation of the warper.

Next, the knots are drawn through the dents 27 of the warp comb 21 by sliding the tongue clamp 91 rearwardly on the arms 92, whereupon the knotter unit may be raised into its elevated position (Figs. 1 and 3).

After removing the tongue of clamp 91 to release the new warp strands, the warp beam is rotated forwardly to retract the knots through the dents of the warp comb 21, the movement continuing until the knots appear below the roll 22 into position such that they may be inspected conveniently.

Finally, the strand guide 23 is restored to its normal running position and the warper comb lowered into the recess 39 in the side members 40 by rotating the crank shaft 46, the latch 50 having of course been released.

We claim as our invention:

1. In an apparatus for operating upon warps having means for supporting an old warp beam containing an old warp to be united with a new warp leading from a new warp supply, means for pairing the strands of the old and new warps to be united including a comb having uniformly spaced dents each adapted to receive a single pair of strands, means for clamping the paired strands adjacent said comb, and a tying mechanism comprising a carriage supported for traveling movement across the combined warps, drive means for advancing the carriage at a uniform rate, tying means on the carriage operative in successive cycles duirng the advance of the carriage, means operative in said tying cycles for seizing successively presented pairs of strands to separate them from the remaining pairs of strands and moving them into operative association with the tying means, and means for stripping the knots from the tying means, said clamping means acting to hold the paired strands yieldably so as to permit slippage thereof in the operation of said seizing means, and said tying means being adapted to sever the paired strands as an incident to the tying operation.

2. In an apparatus for operating upon warps having means for supporting a warp beam containing an old warp to be united with a new warp leading from a new warp supply, means for pairing the strands of the old and new warps including a comb having uniformly spaced dents each adapted to receive a single pair of strands with the strands of each pair taken from the respective warps, means for clamping the paired strands adjacent said comb, and a tying mechanism comprising a carriage supported for traveling movement in a path adjacent and parallel to said comb, drive means for advancing the carriage at a uniform rate, a rotary tying bill on the carriage operative in successive cycles during the advance of the carriage by said drive means, means including a hook for engaging successively presented pairs of strands to separate them from the remaining pairs of strands and move them into operative association with the tying bill, for drawing the knots taut and stripping them from the tying bill, said clamping means acting to hold the paired strands yieldably so as to permit slippage thereof in the operation of said hook, and said tying bill having means adapted to sever the paired strands as an incident to the tying operation.

3. In an apparatus for operating upon warps having means for supporting a warp beam containing an old warp to be united with a new warp leading from a new warp supply, the combination of means for pairing strands of the two warps including a comb having uniformly spaced dents each adapted to receive a single pair of strands, means for clamping the paired strands adjacent said comb and a tying mechanism comprising a carriage supported for traveling movement parallel to said comb and adjacent the same, drive means for advancing the carriage at a uniform rate, a rotary tying bill on the carriage, drive means for said bill operative in successive cycles initiated automatically in response to engagement with the paired strands, and means operating in each of such cycles to separate successively presented pairs of strands from the remaining pairs of strands and carry them into operative association with the tying bill, said clamping means acting to hold the paired strands yieldably so as to permit slippage thereof in the operation of said separating means.

4. In an apparatus for operating upon warps having means for supporting a warp beam containing an old warp to be united with a new warp leading from a new warp supply, the combination of means for retaining the strands of the old and new warps in pairs disposed in uniformly spaced parallel relation with the strands of each pair taken from the respective warps, means for clamping the paired strands, and a tying mechanism comprising a carriage supported for traveling movement across the combined warps, means for advancing the carriage at a uniform rate, tying means on the carriage for operation in successive cycles during the advance thereof, means operative in each tying cycle to draw a pair of strands into operative association with the tying means, drive means for the tying means, and control means for said drive means operating automatically in response to engagement with the pairs of strands to initiate successive tying cycles, said clamping means acting to hold the paired strands yieldably so as to permit slippage thereof in the operation of drawing the strands into operative relation to the tying means.

5. In an apparatus for operating upon warps having means for supporting a warp beam containing an old warp to be united with a new warp leading from a new warp supply, the combination of a pair of combs supported in spaced parallel relation and each providing uniformly spaced dents for receiving pairs of threads taken respectively from the old and the new warps, means for clamping the thread ends formed by severance of the warps from the old warp beam and the new warp supply respectively, and a knotter mechanism mounted for traveling movement between said combs parallel thereto and having drive means for advancing the mechanism at a uniform rate, said mechanism including tying means operative in successive cycles timed with respect to the spacing of the paired strands, and said clamping means acting to hold the paired strands yieldably so as to permit slippage thereof during the operation of the tying means.

6. In an apparatus for operating upon warps having means for supporting a warp beam containing an old warp to be united with a new warp leading from a new warp supply, a comb providing uniformly spaced dents adapted respectively to receive pairs of warp strands with the strands of each pair taken respectively from the old and the new warps, clamping means operative to clamp the old warp at a point adjacent said comb and movable in a direction away from the comb to draw off from the warp beam a predetermined amount of slack, a second comb disposed parallel to and spaced a short distance from the first comb and having dents spaced in accordance with the spacing of the dents of the first comb, clamping means for the new warp movable to draw off a predetermined amount of slack from the new warp supply, both of said clamping means being manipulable to lay the slack portions of the strands in the dents of said combs whereby to arrange the strands in uniformly spaced pairs, and a knotter mechanism operative upon the spaced pairs of strands to unite the same and to sever the end portions thereof leading to said clamping means.

7. In an apparatus for operating upon warps having means for supporting a warp beam containing an old warp to be united with a new warp leading from a new warp supply, a comb providing uniformly spaced dents adapted respectively to receive a pair of warp strands taken respectively from the old and the new warps, clamping means operative to clamp the old warp at a point adjacent said comb and movable in a direction away from the comb to draw off from the warp beam a predetermined amount of slack, a second comb disposed parallel to and spaced a short distance from the first comb and having dents spaced in accordance with the spacing of the dents of the first comb, clamping means for the new warp movable to draw off a predetermined amount of slack from the new warp supply, both of said clamping means being manipulable to lay the slack portions of the strands in the dents of said combs whereby to arrange the strands in uniformly spaced pairs, and a knotter mechanism operative upon the spaced pairs of strands to unite the same and to sever the end portions thereof leading to said clamping means, said clamping means being operative to hold the strands of the respective warps yieldably during the tying operation.

8. In an apparatus for operating upon warps having means for supporting a warp beam containing an old warp to be united with a new warp leading from a new warp supply, a comb providing uniformly spaced dents adapted respectively to receive a pair of warp strands taken respectively from the old and the new warps, clamping means operative to clamp the old warp at a point adjacent said comb and movable in a direction away from the comb to draw off from the warp beam a predetermined amount of slack, clamping means for the new warp movable to draw off a predetermined amount of slack from the new warp supply, both of said clamping means being manipulable to lay the slack portions of the strands in the dents of said comb whereby to arrange the strands in uniformly spaced pairs, and a knotter mechanism operative upon the spaced pairs of strands to unite the same and to sever the end portions thereof leading to said clamping means, said clamping means being operative to hold the strands of the respective warps yieldably during the tying operation.

9. An apparatus for operating upon warps having means for supporting a warp beam containing an old warp to be united with a new warp leading from a new warp supply and a comb having uniformly spaced dents, the combination of a plush clamp for clamping the threads of the old warp adjacent said comb and drawing off a predetermined amount of slack from the old warp, a second comb having dents spaced apart uniformly in accordance with the spacing of the dents of the first comb, a second plush clamp for clamping the strands of the new warp and movable to draw off a predetermined amount of slack from the new warp supply, said clamps being manipulable upon severance of the old warp from the warp beam and of the new warp from its supply to lay pairs of strands taken from the respective warps in the dents of said second comb with the paired strands retained in uniformly spaced relation, and a tying mechanism having means for advancing the same at a uniform rate across the combined warps and operative in successive cycles upon the successively presented pairs of strands to tie and sever the strands.

10. An apparatus for operating upon warps having means for supporting a warp beam containing an old warp to be united with a new warp leading from a new warp supply, the combination of a clamp for clamping the threads of the old warp, a comb having dents spaced apart uniformly, a second clamp for clamping the strands of the new warp, said clamps acting upon pairs of strands taken from the respective warps and laid in the dents of said comb to yieldably hold the strands under tension, and a tying mechanism having means for continuously advancing the same across the combined warps adjacent to said comb at a uniform rate correlated with the pitch of the comb dents, said tying mechanism being operative in successive cycles upon successively engaged pairs of strands to tie and sever the strands.

11. A warping apparatus comprising, in combination, a warper having means for supporting a warp beam, a comb having uniformly spaced dents for guiding the strands of the warp in their passage to the warp beam from a creel or the like, a clamp for clamping the strands of the warp between the comb and the creel so as to permit severance of the strands leading to the creel to form warp ends to be tied to a new warp supply, said clamp being movable from a point adjacent the comb away therefrom to draw off a predetermined amount of slack, and a knotter unit movable into operative association with the warper and including a second comb supported in spaced parallel relation to the first comb, a strand positioning member disposed between the first comb and said clamp and adapted to hold the strands when said clamp is moved to double the slack portions of the strands back upon themselves while positioning them in the dents of said two combs, and a second clamp for clamping the strands leading from a new warp supply and movable to draw off and position a slack length thereof in said combs with the strands of the two warps arranged in pairs, said knotter unit further including tying means operative upon the paired strands to tie and sever the same.

12. A warping apparatus comprising, in combination, a warper having means for supporting a warp beam, a comb having uniformly spaced dents for guiding the strands of the warp in their passage to the warp beam from a creel or the like, a clamp for clamping the strands of the warp at a point adjacent said comb and permitting severance of the warp between the clamp and the creel whereby to form warp ends to be tied to a new warp supply, means supporting said clamp for movement in a direction away from the comb to draw off a predetermined amount of slack, and a knotter unit movable into operative association with the warper and having a strand positioning member disposed between said comb and said clamp and about which the strands may be doubled upon themselves and placed in the dents of said comb, means on said knotter unit for supporting a second clamp for positively gripping the strands of a new warp leading from a new warp supply and arranged in the dents of said comb in paired relation to the strands of the old warp, and a tying mechanism having means for advancing the same at a uniform rate across the combined warps adjacent said comb, said mechanism being operative in successive cycles upon successively engaged pairs of strands to tie and sever the same.

13. A warping apparatus comprising, in combination, a warper having means for supporting a warp beam, a comb having uniformly spaced dents for guiding the strands of the warp in their passage to the warp beam from a creel or the like, a clamp for clamping the strands of the warp at a point adjacent said comb and permitting severance of the warp between the clamp and the creel whereby to form warp ends to be tied to a new warp supply, means supporting said clamp for movement in a direction away from the comb to draw off a predetermined amount of slack, and a knotter unit movable into operative association with the warper and having a strand positioning member disposed between said comb and said clamp and about which the strands may be doubled upon themselves and placed in the dents of said comb, means on said knotter unit for supporting a second clamp for positively gripping the strands of a new warp leading from a new warp supply and arranged in the dents of said comb in paired relation to the strands of the old warp, and a tying mechanism having means for advancing the same at a uniform rate across the combined warps adjacent said comb, said mechanism being operative in successive cycles upon successively engaged pairs of strands to tie and sever the same, and clamping means on the warper for positively gripping the strands of the new warp at a point between said comb and the new warp supply.

14. A warping apparatus comprising, in combination, a warper having means for supporting a warp beam and a comb having uniformly spaced dents for guiding the strands of the warp in their passage to the beam from a creel or the like, a tongue clamp for positively gripping the strands of the warp at a point adjacent said comb and permitting severance of the warp between the clamp and the creel whereby to form warp ends to be tied to a new warp supply leading from the creel, means for supporting said clamp for movement in a direction away from the comb to draw off a predetermined amount of slack, a knotter unit movable into operative association with the warper and having a second comb with dents uniformly spaced apart in accordance with the spacing of the warper comb, and a strand positioning member disposed between said warper comb and said tongue clamp, said tongue clamp being movable to carry said slack portions of the old warp strands reversely around said member while doubling the strands upon themselves for placement in the dents of said combs, means on said knotter unit for supporting a plurality of plush clamps and a second tongue clamp for positively gripping the strands of the new warp leading from a new warp supply on the creel through the dents of the two combs in paired relation to the strands of the old warp, said plush clamps being operative to clamp the thread ends of the two warps yieldably upon severance of the strands leading to the tongue clamps, and a tying mechanism having means for advancing the same at a uniform rate across the combined warps and between said combs, said mechanism being operative in successive cycles upon successively engaged pairs of strands to tie and sever the same.

15. A warping apparatus comprising, in combination, a warper having means for supporting a warp beam and a comb having uniformly spaced dents, a tongue clamp for positively gripping the strands of the warp at a point adjacent said comb, means for supporting said clamp for movement in a direction away from the comb to draw off a predetermined amount of slack, a knotter unit movable into operative association with the warper and having a strand positioning member disposed between said warper comb and said tongue clamp, said tongue clamp being movable upon severance of the strands leading to the creel to carry said slack portions of the old warp strands reversely around said member while doubling the strands upon themselves for placement in the dents of said comb, means on said knotter unit for supporting a plurality of plush clamps, a second tongue clamp for positively gripping the strands of a new warp leading from a new warp supply on the creel through the dents of the two combs in paired relation to the strands of the old warp, and a tying mechanism having means for advancing the same at a uniform rate across the combined warps and adjacent said comb, said mechanism being operative in successive cycles upon successively engaged pairs of stands to tie and sever the same, and said second tongue clamp having a facing of card cloth adapted temporarily to hold the new warp strands after the latter have been drawn through said comb and pending positive gripping by the second tongue clamp.

16. A warping apparatus comprising, in combination, a warper having means for supporting a warp beam containing an old warp and a creel providing a supply for a new warp to be united with the old warp, said warper having a comb with uniformly spaced dents, a tongue clamp for positively gripping the strands of the old warp at one side of said comb, means for supporting said clamp for movement in a direction away from the comb to draw off a predetermined amount of slack, a knotter unit movable into operative association with the warper and having a strand positioning member disposed between said warper comb and said tongue clamp, said tongue clamp being movable to carry said slack portions of the old warp strands reversely around said member while doubling the strands upon themselves for placement in the dents of said comb, means on said knotter unit for supporting a plurality of plush clamps, a second tongue clamp for positively gripping the strands of a new warp leading from a new warp supply on the creel through the dents of the two combs in paired relation to the strands of the old warp, a third tongue clamp supported between the knotter and creel for positively gripping the new warp, and a knotter mechanism having means for advancing the same at a uniform rate across the combined warps and adjacent said comb, said mechanism being operative in successive cycles upon successively engaged pairs of strands to tie and sever the same, said third tongue clamp being supported for movement in a direction away from the knotter unit and operative upon such movement to draw the knots formed in the tying operation through said warper comb.

17. In an apparatus for operating upon warps having means for supporting a warp beam containing an old warp and yarn mass supporting means providing a supply for a new warp to be united with an old warp, a comb having dents spaced apart uniformly, a tongue clamp for gripping the strands of the old warp adjacent said comb and between it and said yarn mass supporting means and permitting severance of the old warp between said clamp and the yarn mass supporting means, a knotter unit movable into operative association with the warp and having a strand positioning member disposed between said comb and said clamp, said clamp being movable manually to double the strands about said member for placement in the dents of said comb, a second tongue clamp for gripping the strands of a new warp supply passing through the dents of such comb, means on said knotter unit for supporting a plurality of plush clamps adapted to hold the old and new warp strands yieldably upon severance of such strands from their respective tongue clamps, and a tying mechanism having means for advancing the same at a uniform rate across the combined warps adjacent said comb, said mechanism being operative in successive cycles upon successively engaged pairs of strands to tie and sever the same.

18. In an apparatus for operating upon warps having means for supporting a warp beam containing an old warp and yarn mass supporting means providing a supply for a new warp to be united with an old warp, a comb having dents spaced apart uniformly, a tongue clamp for gripping the strands of the old warp adjacent said comb and between it and said yarn mass supporting means and permitting severance of the old warp between said clamp and the yarn mass supporting means, a knotter unit movable into operative association with the warp and having a second comb parallel with the warper comb and strand positioning member disposed between said warper comb and said clamp, said clamp being movable manually to double the strands about said member for placement in the dents of the two combs, a second tongue clamp for gripping the strands of a new warp supply passing through the dents of said combs, means on said knotter unit for supporting a plurality of plush clamps adapted to hold the old and new warp strands yieldably upon severance of such strands from their respective tongue clamps, and a tying mechanism having means for advancing the same at a uniform rate between said combs, said mechanism being operative in successive cycles upon successively engaged pairs of strands to tie and sever the same.

19. In an apparatus for operating upon warps having means for supporting a warp beam containing an old warp and yarn mass supporting means providing a supply for a new warp to be united with the old warp, a comb having dents spaced apart uniformly for receiving severed end portions of the two warps with the strands of the respective warps combined and arranged in pairs in the dents of said comb, a tying mechanism having means for advancing the same continuously across the combined warps adjacent said comb at a uniform rate correlated with the pitch of the paired strands, said tying mechanism being operative in successive cycles to separate successive pairs of strands from the remaining pairs and to tie and sever the same.

20. In an apparatus for operating upon warps having means for supporting a warp beam containing an old warp and yarn mass supporting means providing a supply for a new warp to be united with the old warp, a comb having dents spaced apart uniformly for receiving severed end portions of the two warps with the strands of the respective warps combined and arranged in pairs in the dents of said comb, a tying mechanism having means for advancing the same continuously across the combined warps adjacent said comb at a uniform rate correlated with the pitch of the paired strands, said tying mechanism being operative in successive cycles upon successively engaged pairs of strands to tie and sever the same and including a rotary tying bill and means acting in timed relation to said bill for drawing the strands into operative relation to the bill.

21. In an apparatus for operating upon warps, the combination of a comb having uniformly spaced dents for receiving the strands of the two warps with the strands arranged in pairs in the dents of said comb, a carriage having drive means for advancing the same continuously across the combined warps at a uniform rate correlated with the pitch of the paired strands, a rotary tying bill on the carriage, means for driving the tying bill in successive cycles, said tying bill being disposed at one side of the plane of the combined warps, and means operating in timed relation to the tying bill for drawing successive pairs of strands into operative relation to the tying bill.

22. In an apparatus for operating upon warps, the combination of means supporting two warps to be united with the strands of one warp paired with the strands of the other and the pairs held in uniformly spaced relation and under tension, said means including two parallel supports spaced apart lengthwise of the warps and a comb having uniformly spaced dents receiving and holding the paired strands, and a tying mechanism comprising a carriage supported for movement between said supports parallel thereto and having drive means for advancing the carriage at a uniform rate across said warps, a rotary tying bill on said carriage, means operative in the advance of the carriage to draw successively engaged pairs of strands into operative association with the tying bill, said tying bill being disposed at one side of the plane of the combined warps, and means for rotating the tying bill and actuating said positioning means in successive cycles correlated with the spacing of the paired strands.

23. In an apparatus for operating upon warps, the combination of a comb having uniformly spaced dents for receiving and retaining pairs of strands from two warps to be united, with the paired strands in spaced parallel relation, a carriage mounted for movement transversely of the warps, power driven means for advancing the carriage at a uniform rate, a rotary tying bill on the carriage, drive means for said tying bill including a constantly driven actuator, a driven member operatively connected with the tying bill and movable into and out of driving relation with respect to said actuator, latch means for holding said driven member in disengaged relation to the actuator, a feeler engageable with the paired strands for disengaging said latch means to establish a driving connection between the actuator and said driven member, and means operative at the end of a predetermined cycle of the tying bill to disengage said driven member from the actuator and reengage said latch means.

24. In an apparatus for operating upon warps, the combination of a comb having uniformly spaced dents for receiving and retaining pairs of strands from two warps to be united, with the paired strands in spaced parallel relation, a carriage mounted for movement transversely of the warps, power driven means for advancing the carriage at a uniform rate, a rotary tying bill on the carriage, drive means for the tying bill including a constantly driven actuator, a rotary member operatively connected with the tying bill, a dog on said rotary member, latch means normally holding said dog out of driving engagement with said actuator, a feeler engageable with the successive pairs of strands for disengaging said latch means to effect movement of said dog into driving engagement with the actuator, and means operative upon the completion of a predetermined operating cycle of the tying bill to disengage said dog from the actuator.

25. In an apparatus for operating upon warps, the combination of a comb having uniformly spaced dents for receiving and retaining pairs of strands from two warps to be united, with the paired strands in spaced parallel relation, a carriage mounted for movement transversely of the warps, power driven means for advancing the carriage at a uniform rate, a rotary tying bill on the carriage, drive means for the tying bill including a constantly driven actuator, a rotary member operatively connected with the tying bill, a dog on said rotary member, latch means normally holding said dog out of driving engagement with said actuator, a feeler engageable with the successive pairs of strands for disengaging said latch means to effect movement of said dog into driving engagement with the actuator, cam means operative to reengage said latch means, and means operative upon the completion of a predetermined operating cycle of the tying bill to disengage said dog from the actuator.

26. In an apparatus for operating upon warps, the combination of a comb having uniformly spaced dents for receiving and retaining pairs of strands from two warps to be united with the paired strands in spaced parallel relation, a carriage mounted for movement transversely of the warps, power driven means for advancing the carriage at a uniform rate, a rotary tying bill on the carriage, drive means for the carriage including a ratchet disk, a rotary member operatively connected with the tying bill, a dog on said member, latch means normally holding said dog out of engagement with said ratchet disk, said dog being biased for movement toward the disk, said latch means comprising a pair of interengageable latch members, a spring acting upon one of said members, and a feeler on the last mentioned member for moving the same against the action of said spring and into disengaged position with respect to the other member, said feeler being operative upon engagement with successive pairs of strands to move its latch member against the action of said spring.

27. In an apparatus for operating upon warps, the combination of a comb having uniformly spaced dents for receiving and retaining pairs of strands from two warps to be united with the paired strands in spaced parallel relation, a carriage mounted for movement transversely of the warps, drive means for advancing the carriage at a uniform rate, a rotary tying bill on the carriage, a motor driven ratchet disk, a disengageable driving connection between said ratchet disk and said tying bill including a rotary member operatively connected with the tying bill, a dog on said member biased for movement toward said disk, latch means normally holding said dog out of engagement with said ratchet disk comprising a pair of interengageable latch members, and a spring acting upon one of said members, a feeler on the last mentioned latch member for moving the same against the action of said spring and into disengaged position with respect to the other member, said feeler being operative upon engagement with successive pairs of strands to move its latch member against the action of said spring, and means timed with the rotation of said ratchet disk for periodically relieving the frictional pressure between said latch members.

28. In an apparatus for operating upon warps comprising means for retaining pairs of strands from two warps to be united with the paired strands in spaced parallel relation, a knotter mechanism comprising a carriage mounted for movement transversely of the warps, drive means for advancing the carriage at a uniform rate, a rotary tying bill on the carriage, a continuously driven actuator, a disengageable driving connection between said actuator and the tying bill, and feeler means operative automatically upon engagement with the successive pairs of strands to render said connection effective to impart a predetermined rotational movement to said tying bill.

29. In an apparatus for operating upon warps comprising a comb with uniformly spaced dents for receiving and retaining pairs of strands from two warps to be united with the paired strands in spaced parallel relation, a knotter mechanism comprising a carriage mounted for movement transversely of the warps, drive means for advancing the carriage at a uniform rate, a rotary tying bill on the carriage, a continuously driven actuator, a disengageable driving connection between said actuator and the tying bill, latch means normally operative to maintain said connection ineffective, and means including a strand responsive feeler operative automatically upon engagement of the feeler with successive pairs of strands to release said latch means to effect engagement of said connection.

30. In an apparatus for operating upon warps comprising a comb with uniformly spaced dents for receiving and retaining pairs of strands from two warps to be united with the paired strands in spaced parallel relation, a knotter mechanism comprising a carriage mounted for movement transversely of the warps, drive means for advancing the carriage at a uniform rate, a rotary tying bill on the carriage, a continuously driven actuator, a disengageable driving connection between said actuator and the tying bill, latch means normally operative to maintain said connection ineffective including a pair of interengaging latch elements, means acting periodically in the advance of the carriage to separate said latch elements, and means for disengaging the latch means and engaging said driving connection including a feeler operatively associated with one of said latch elements to move it in response to engagement with successive pairs of strands during separation of the elements.

31. In an apparatus for operating upon warps for holding pairs of strands taken from two warps to be united with the paired strands in spaced parallel relation, a knotter mechanism having means for advancing the same at a uniform rate across the warps and a rotary tying bill, a continuously driven ratchet disk, a rotary member operatively connected with the tying bill and having a driving dog biased for movement into engagement with the disk, latch means operative to hold said dog out of engagement with the ratchet disk including a member having a stop thereon for coaction with said dog, means including a strand responsive feeler for causing disengagement of the latch means to permit movement of said dog into driving engagement with the ratchet disk, and cam means for restoring said stop into the path of movement of the dog to disengage the same upon the completion of one revolution of the disk.

32. In an apparatus for operating upon warps for holding pairs of strands taken from two warps to be united with the paired strands in spaced parallel relation, a knotter mechanism including means for advancing the same at a uniform rate across the warps and a rotary tying bill, a continuously driven ratchet disk, a rotary member operatively connected with the tying bill and having a driving dog biased for movement into engagement with the disk, latch means operative to hold said dog out of engagement with the ratchet disk including a member having a stop thereon for coaction with said dog, means including a strand responsive feeler for causing disengagement of the latch means to permit movement of said dog into driving engagement with the ratchet disk and cam means for restoring said stop into the path of movement of the dog to disengage the same upon the completion of one revolution of the disk, said cam means further acting to cause reengagement of the latch means as an incident to the said restoring movement of said stop.

33. In an apparatus for operating upon warps for holding pairs of strands taken from two warps to be united with the paired strands in spaced parallel relation, a knotter mechanism having means for advancing the same at a uniform rate across the warps, and including a rotary tying bill, a continuously driven ratchet disk, a rotary member operatively connected with the tying bill and having a driving dog, latch means operative to hold said dog out of engagement with the ratchet disk including two interengaging latch elements, a member fixed with respect to one of said elements and having a stop thereon for coaction with said dog, a strand responsive feeler on the other one of said latch elements movable as an incident to the engagement of successive pairs of strands to disengage said latch element, spring means operative upon disengagement of the latch elements to force said dog into driving engagement with the ratchet disk, and cam means operative upon said member to restore said stop into the path of movement of the dog to disengage the same upon the completion of one revolution of the disk.

34. In an apparatus for operating upon warps for holding pairs of strands taken from two warps to be united with the paired strands in spaced parallel relation, a knotter mechanism having means for advancing the same at a uniform rate across the warps, and including a rotary tying bill, a continuously driven ratchet disk, a rotary member operatively connected with the tying bill and having a driving dog, latch means operative to hold said dog out of engagement with the ratchet disk including two interengaging latch elements, a member fixed with respect to one of said elements and having a stop thereon for coaction with said dog, a strand responsive feeler on the other one of said latch elements, movable as an incident to the engagement of successive pairs of strands to disengage said latch element, spring means operative upon disengagement of the latch elements to force said dog into driving engagement with the ratchet disk and cam means operative upon said member to restore said stop into the path of movement of the dog to disengage the same upon the completion of one revolution of the disk, said cam means comprising a multilobed cam disk operative to reengage said latch elements and to relieve the pressure periodically between the latch elements.

35. The method of operating upon warps in a warping apparatus comprising a warper supporting a warp beam, a creel providing a new warp supply and a comb having dents for guiding the strands in their passage from the creel to the warp beam, said method comprising clamping the old warp adjacent the comb and between it and the creel and moving the clamp to draw off a slack length of yarn, severing the strands between the clamp and the creel, placing a strand engaging member between the comb and the clamp, moving the clamp to double the strands of the old warp upon themselves and laying them in the dents of the comb, drawing the ends of a new warp from the creel and positioning the strands in the dents of the comb in paired relation to the strands of the old warp, yieldably clamping the thread ends of the two warps, and tying and severing the successive pairs of strands.

36. The method of operating upon warps in uniting the ends of a new warp with the ends of an old warp contained on a rotatably supported warp beam, said method comprising laying the strands of the two warps in pairs in a comb having uniformly spaced dents, yieldably clamping the warp ends to hold the paired strands under tension, tying the paired strands and cutting off the clamped ends, clamping the strands of the new warp in a movable clamp, moving said clamp to draw the knots formed in the tying operation through the dents of the comb, and then retracting the knots through the comb dents by revolving the warp beam.

37. The method of operating upon warps in a warping apparatus comprising a warper supporting a warp beam, a creel providing a new warp supply and a comb having dents for guiding the strands in their passage from the creel to the warp beam, said method comprising clamping the old warp adjacent the comb and between it and the creel and moving the clamp to draw off a slack length of yarn, severing the strands between it and the creel and moving the clamp to draw off a slack length of yarn, severing the strands between the clamp and the creel, placing a strand engaging member between the comb and the clamp, moving the clamp to double the strands of the old warp upon themselves and laying them in the dents of the comb, drawing the ends of a new warp from the creel and positioning the strands in the dents of the comb in paired relation to the strands of the old warp, yieldably clamping the thread ends of the two warps, tying the successive pairs of strands and cutting off the clamped ends, gripping the new warp between said comb and the creel by means of a movable clamp, and moving the last mentioned clamp to draw the knots formed in the tying operation through the comb to take up slack in the tied strands.

38. The method of operating upon warps in a warping apparatus comprising a warper supporting a warp beam, a creel providing a new warp supply and a comb having dents for guiding the strands in their passage from the creel to the warp beam, said method comprising clamping the old warp adjacent the comb and between it and the creel and moving the clamp to draw off a slack length of yarn, severing the strands between the clamp and the creel, placing a strand engaging member between the comb and the clamp, moving the clamp to double the strands of the old warp upon themselves and laying them in the dents of the comb, drawing the ends of a new warp from the creel and positioning the strands in the dents of the comb in paired relation to the strands of the old warp, yieldably clamping the thread ends of the two warps, tying the successive pairs of strands and cutting off the clamped ends, gripping the new warp between said comb and the creel by means of a movable clamp, and moving the last mentioned clamp to draw the knots formed in the tying operation through the comb to take up slack in the tied strands, and revolving the warp beam slowly to retract the knots through the comb.

39. The method of operating upon warps in a warping apparatus comprising a warper supporting a warp beam, a creel providing a new warp supply and a comb having dents for guiding the strands in their passage from the creel to the warp beam, said method comprising clamping the old warp adjacent the comb and between it and the creel and moving the clamp to draw off a slack length of yarn, severing the strands between the clamp and the creel, placing a strand engaging member between the comb and the clamp, moving the clamp to double the strands of the old warp upon themselves and laying them in the dents of the comb, drawing the ends of a new warp from the creel and positioning the strands in the dents of the comb in paired relation to the strands of the old warp, placing the strands near their clamped ends in plush clamps to yieldably hold the strands under tension and tying the strands while cutting off the clamped ends thereof.

BROOKS MARCELLUS.
BURT A. PETERSON.

REFERENCES CITED

The following references are of record in the file of this patent:

UNITED STATES PATENTS

| Number | Name | Date |
|---|---|---|
| 1,133,830 | Wenzel | Mar. 30, 1915 |
| 2,011,115 | Peterson | Aug. 13, 1935 |

FOREIGN PATENTS

| Number | Country | Date |
|---|---|---|
| 17,202 | Australia | Mar. 5, 1935 |
| 175,320 | Switzerland | Feb. 28, 1935 |
| 309,766 | Germany | Dec. 13, 1918 |